(12) United States Patent
Broome

(10) Patent No.: US 12,511,727 B2
(45) Date of Patent: Dec. 30, 2025

(54) GROOVE WEAR MEASUREMENT SYSTEM AND METHOD

(71) Applicant: Acushnet Company, Fairhaven, MA (US)

(72) Inventor: Peter M. Broome, Jupiter, FL (US)

(73) Assignee: ACUSHNET COMPANY, Fairhaven, MA (US)

(\*) Notice: Subject to any disclaimer, the term of this patent is extended or adjusted under 35 U.S.C. 154(b) by 318 days.

(21) Appl. No.: 18/352,082

(22) Filed: Jul. 13, 2023

(65) Prior Publication Data

US 2025/0022113 A1   Jan. 16, 2025

(51) Int. Cl.
*G06T 7/00* (2017.01)

(52) U.S. Cl.
CPC .. *G06T 7/0002* (2013.01); *G06T 2207/30221* (2013.01)

(58) Field of Classification Search
CPC ......... G06T 7/0002; G06T 2207/30221; G06T 2207/10024; G06T 2207/10028; G06T 2207/20084; G06T 2207/30136; G06T 7/50; G01B 11/16; A63B 53/0445
USPC ....................................................... 382/108
See application file for complete search history.

(56) References Cited

U.S. PATENT DOCUMENTS 8,430,761 B2 \* 4/2013 Fedorochko ........... A63B 60/00
473/332

FOREIGN PATENT DOCUMENTS

WO   WO-2013052335 A1 \*  4/2013 ......... A63B 53/0466

OTHER PUBLICATIONS

United States Golf Association And R&A Rules Limited, "Groove Measurement Procedure Outline" USGA-TPX3001 Revision 1.0.0, Aug. 2008, 11 pages.

\* cited by examiner

*Primary Examiner* — Neil R McLean
(74) *Attorney, Agent, or Firm* — Womble Bond Dickinson (US) LLP

(57) ABSTRACT

A method for estimating groove wear, the method including: receiving one or more captured images of a striking face of a first golf club head having a first set of grooves in the striking face; comparing, by at least one processor, the one or more captured images to a plurality of reference images, including at least a first reference image and a second reference image, wherein the first reference image includes an image of a first reference striking face having a first level of groove wear, and the second reference image includes an image of a second reference striking face having a second level of groove wear different from the first level of groove wear; and estimating, by the at least one processor and based on the comparison, a determined level of groove wear of the striking face of the first golf club head.

20 Claims, 11 Drawing Sheets

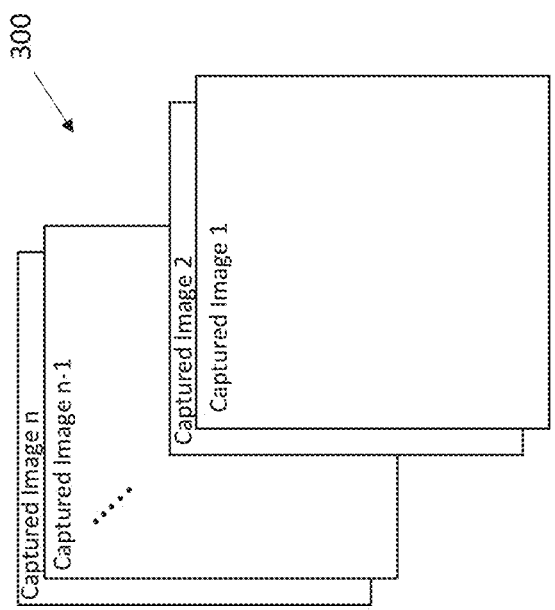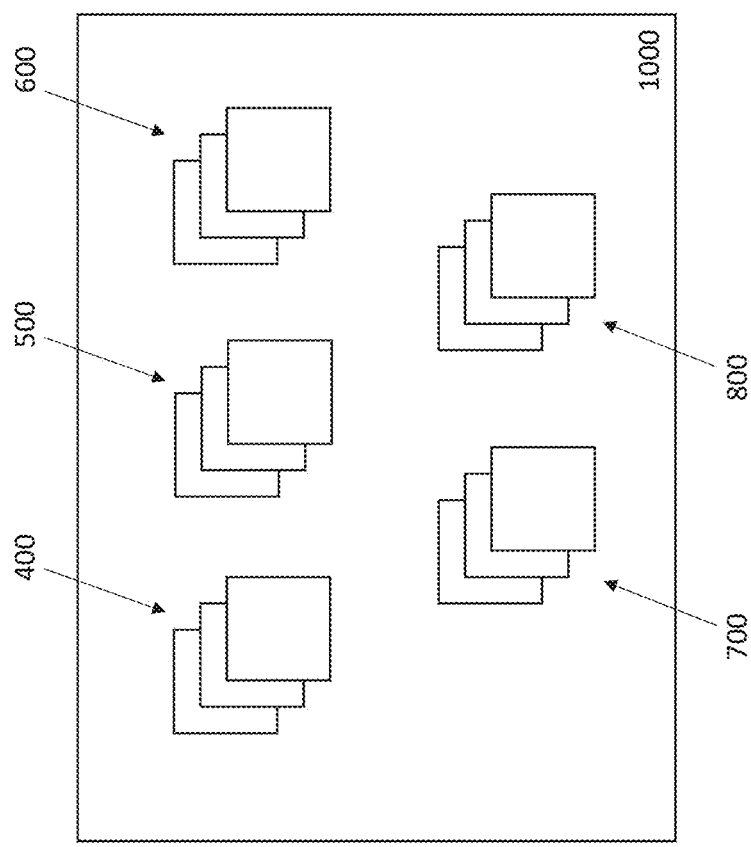
FIG. 5

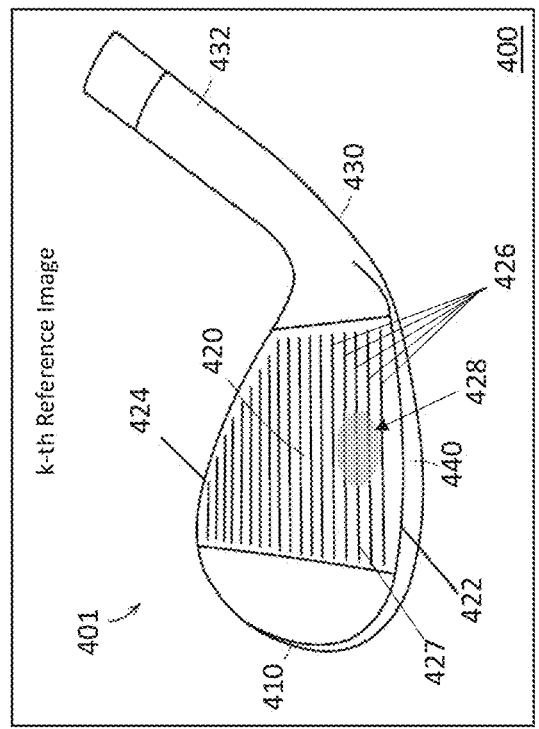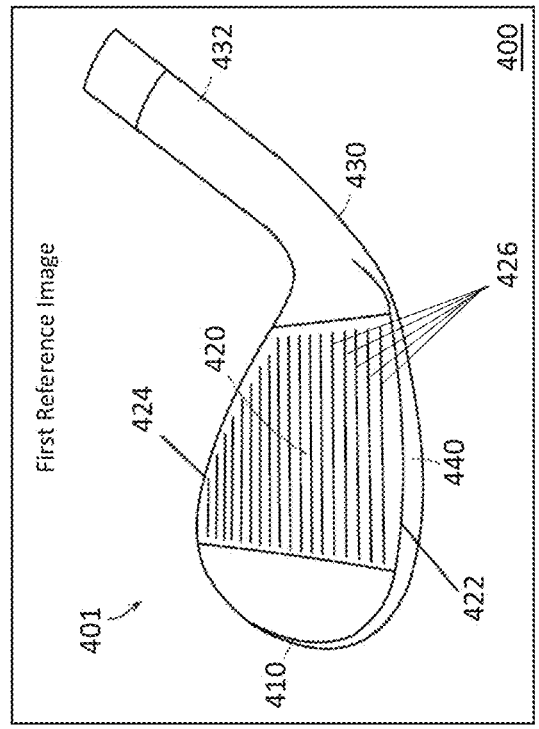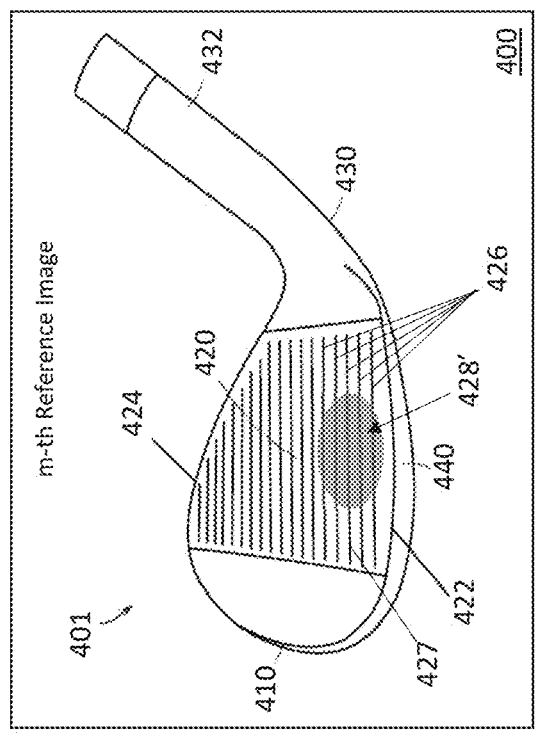
FIG. 8

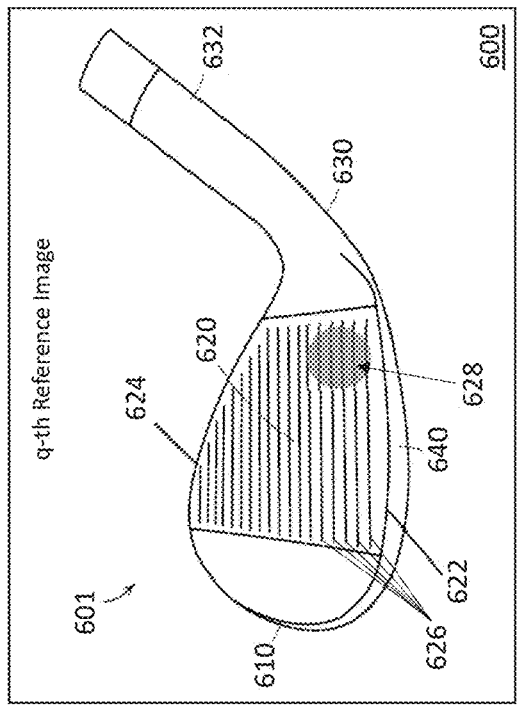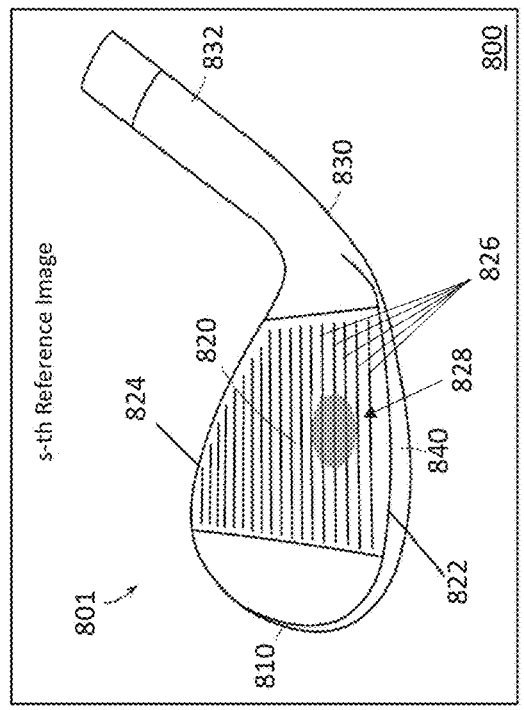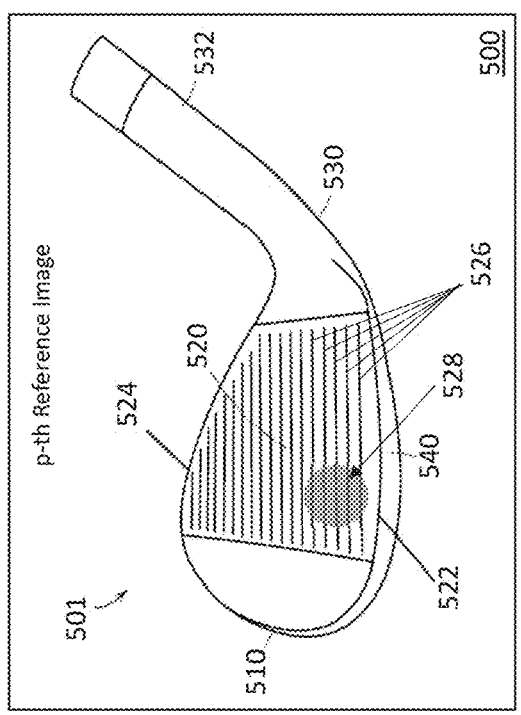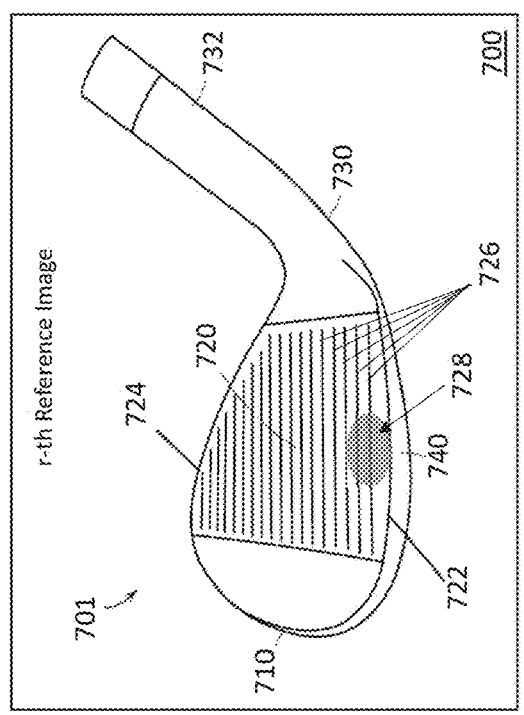
FIG. 9

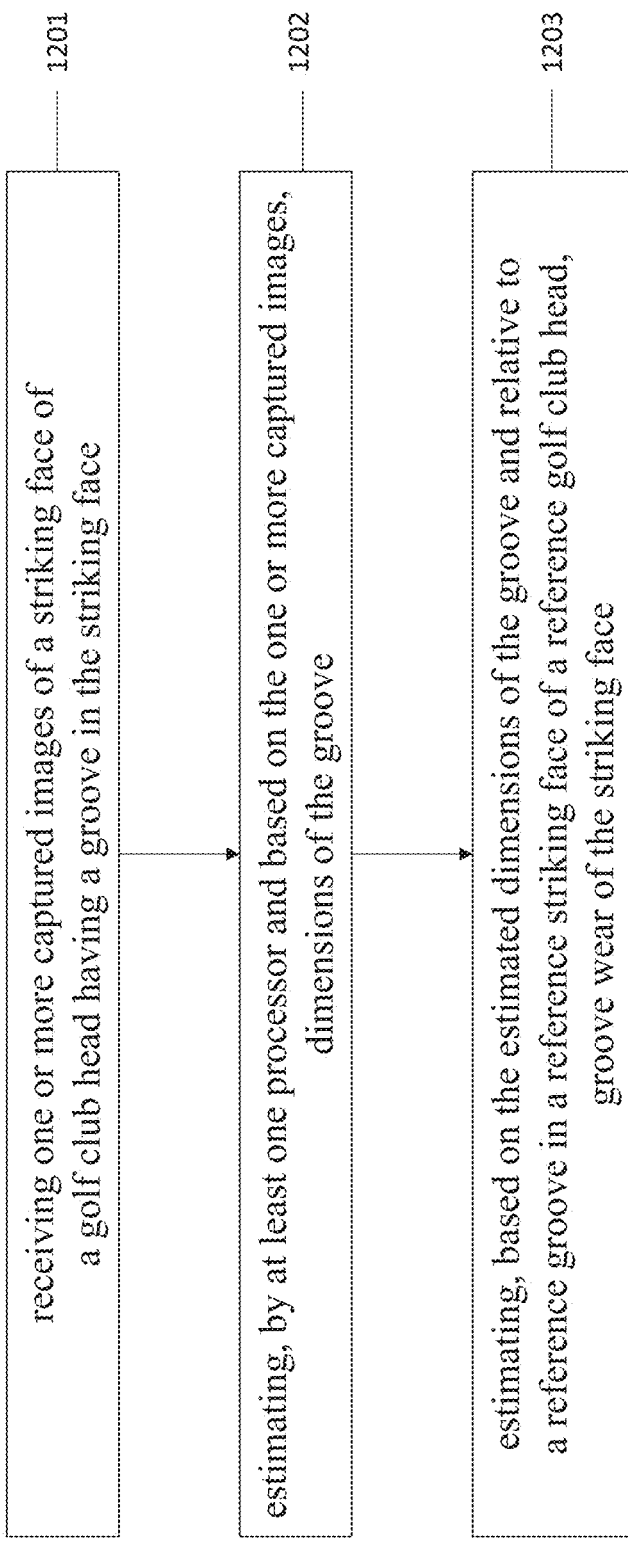

GROOVE WEAR MEASUREMENT SYSTEM AND METHOD

BACKGROUND

The present disclosure relates to systems and methods for measuring groove wear of a golf club head. A golf club head may have a striking face configured to strike a golf ball, and may have a plurality of grooves defined therein that help to impart spin on the golf ball when struck. However, hitting golf balls, especially when hitting out of bunkers, can wear down the striking face and the grooves defined therein. When the grooves become worn down, their capacity to impart spin on the golf ball may be degraded. It may therefore be desirable to replace the golf club head after sufficient degradation of the grooves occurs. It is with respect to this technical environment that aspects of the present disclosure are directed.

SUMMARY

According to an aspect, the technology relates to a method for estimating groove wear, the method including: receiving one or more captured images of a striking face of a first golf club head having a first set of grooves in the striking face; comparing, by at least one processor, the one or more captured images to a plurality of reference images, including at least a first reference image and a second reference image, wherein the first reference image includes an image of a first reference striking face having a first level of groove wear, and the second reference image includes an image of a second reference striking face having a second level of groove wear different from the first level of groove wear; and estimating, by the at least one processor and based on the comparison, a determined level of groove wear of the striking face of the first golf club head.

In an example, the comparing includes determining that groove wear of the first set of grooves in the one or more captured images more closely resembles groove wear of a set of grooves in the first reference striking face in the first reference image than groove wear of a set of grooves in the second reference striking face in the second reference image, and the estimating includes estimating the determined level of groove wear of the striking face of the first golf club head based on the first level of groove wear.

In another example, a first groove from among the first set of grooves has a greatest level of wear in the one or more captured images, a first reference groove has a greatest level of wear from among a set of grooves in the first reference striking face in the first reference image, and a second reference groove has a greatest level of wear from among a set of grooves in the second reference striking face in the second reference image, and the comparing includes comparing the first groove in the one or more captured images to the first reference groove in the first reference image and to the second reference groove in the second reference image.

In another example, the first set of grooves includes an Nth groove from a lower leading edge of the striking face of the first golf club head, the first reference striking face has a set of grooves including an Nth groove from a lower leading edge of the first reference striking face, the second reference striking face has a set of grooves including an Nth groove from a lower leading edge of the second reference striking face, and the comparing includes comparing the Nth groove of the striking face in the one or more captured images to the Nth groove of the first reference striking face in the first reference image and to the Nth groove of the second reference striking face in the second reference image.

In another example, the comparing includes comparing the first set of grooves in the striking face of the first golf club head in the one or more captured images respectively to a set of corresponding grooves in the first reference striking face in the first reference image and respectively to a set of corresponding grooves in the second reference striking face in the second reference image.

In another example, the first golf club head, a golf club head having the first reference striking face, and a golf club head having a second reference striking face are all a same type of golf club head.

In another example, the method further includes retrieving, from electronic storage: the plurality of reference images; and for each reference image of the reference images, at least one of a groove depth or a groove edge radius of one or more grooves shown in the reference image.

In another example, the method further includes capturing the one or more captured images by a camera, wherein the camera and the at least one processor are in a phone, a tablet, a computer, a smart watch, or smart glasses.

According to another aspect, the technology relates to a method for estimating groove wear, the method including: receiving one or more captured images of a striking face of a golf club head having a groove in the striking face; estimating, by at least one processor and based on the one or more captured images, dimensions of the groove; and estimating, based on the estimated dimensions of the groove and relative to a reference groove in a reference striking face of a reference golf club head, groove wear of the striking face based on at least one of a decrease in groove depth of the groove or an increase in groove edge radius of the groove.

In an example, the golf club head and the reference golf club head are a same type of golf club head, and the reference groove has substantially no groove wear.

In another example, the method includes at least one of: estimating the decrease in groove depth of the groove by determining a groove depth of the groove based on the estimated dimensions of the groove, retrieving a groove depth of the reference groove from a memory, and comparing the groove depth of the groove to the groove depth of the reference groove, or estimating the increase in groove edge radius of the groove by determining a groove edge radius of the groove based on the estimated dimensions of the groove, retrieving a groove edge radius of the reference groove from a memory, and comparing the groove edge radius of the groove to the groove edge radius of the reference groove.

In another example, the groove is a groove that has a greatest level of groove wear from among a set of grooves in the striking face, and the reference groove is a groove that has a greatest level of groove wear from among a set of grooves in the reference striking face, or the groove is an Nth groove from a lower leading edge of the striking face from among a set of grooves in the striking face, and the reference groove is an Nth groove from a lower leading edge of the reference striking face from among a set of grooves in the reference striking face.

In another example, a set of grooves are in the striking face, a set of respectively corresponding reference grooves are in the reference striking face, and the method further includes: estimating, by the at least one processor, dimensions of each of the set of grooves in the striking face; and comparing, by the at least one processor and in terms of at least one of groove depth or groove edge radius, each of the set of grooves respectively to the set of corresponding reference grooves.

In another example, the estimating the dimensions of the groove and the estimating the groove wear of the striking face are performed by the at least one processor when executing instructions stored in a memory operatively coupled to the at least one processor.

In another example, the method further includes capturing, by a camera, the one or more captured images, wherein the camera, the at least one processor, and the memory are included in a phone, a tablet, a computer, a smartwatch, or smart glasses.

In another example, the at least one processor is in a first device, and the method further includes wirelessly receiving the one or more captured images from a second device.

According to another aspect, the technology relates to a system, including: at least one processor; and a memory, operatively connected to the at least one processor and storing instructions that, when executed, cause the at least one processor to perform a method, the method including: receiving one or more captured images of a striking face of a first golf club head having a first set of grooves in the striking face; comparing, by the at least one processor, the one or more captured images to a plurality of reference images, including at least a first reference image and a second reference image, wherein the first reference image includes an image of a first reference striking face having a first level of groove wear, and the second reference image includes an image of a second reference striking face having a second level of groove wear different from the first level of groove wear; and estimating, by the at least one processor and based on the comparison, a determined level of groove wear of the striking face of the first golf club head.

In an example, the comparing includes determining that groove wear of the first set of grooves in the one or more captured images more closely resembles groove wear of a set of grooves in the first reference striking face in the first reference image than groove wear of a set of grooves in the second reference striking face in the second reference image, and the estimating includes estimating the determined level of groove wear of the striking face of the first golf club head based on the first level of groove wear.

In another example, the system further includes a camera, wherein the method further includes capturing, by the camera, the one or more captured images, and wherein the at least one processor, the memory, and the camera are in a phone, a tablet, a computer, a smartwatch, or smart glasses.

In another example, the at least one processor are in a first device, and the method further includes wirelessly receiving the one or more captured images from a second device.

This summary section describes nonlimiting and non-exhaustive examples of the present disclosure, and is not intended to limit the scope of the claims in any manner.

BRIEF DESCRIPTION OF THE DRAWINGS

The drawings, together with the specification, illustrate non-limiting and non-exhaustive examples of the present disclosure.

FIG. 5 depicts a reference image library and a set of captured images for use in detecting the groove wear of the golf club head according to some examples.

FIG. 8 depicts some specific reference images from the set of reference images of FIG. 7.

FIG. 9 depicts some specific reference images respectively from some sets of reference images from the reference image library of FIG. 5.

FIGS. 10 and 11 each depict flow diagrams of methods for estimating groove wear according to some examples.

DETAILED DESCRIPTION

Figure 1:
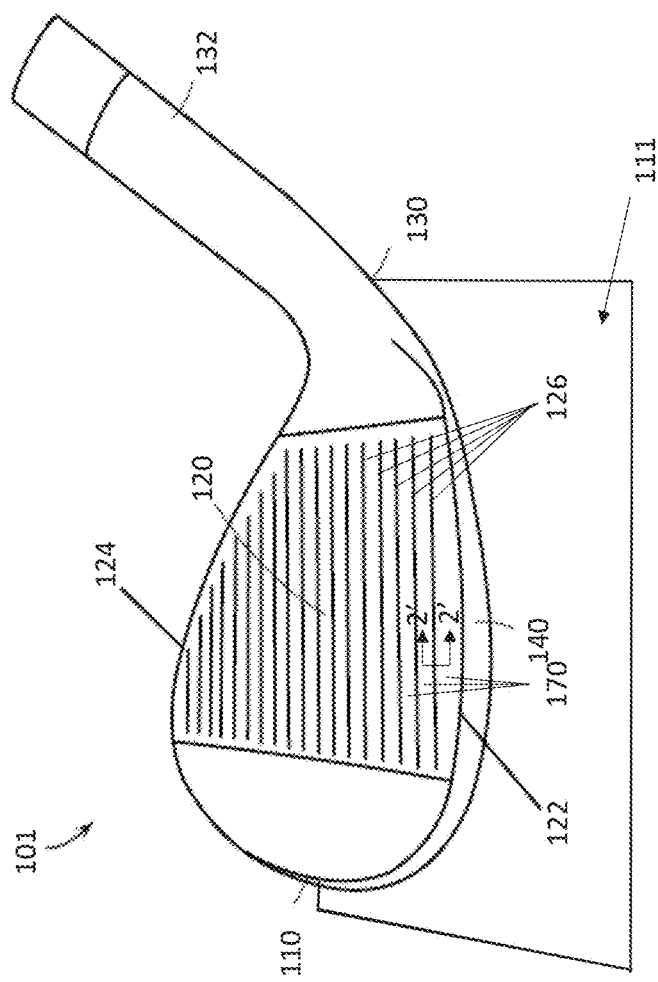
FIG. 1 depicts a frontal view of an example iron golf club head.

Systems and methods for measuring groove wear in golf club heads will now be described with reference to the figures.

It will be understood that, although the terms "first", "second", "third", etc., may be used herein to describe various elements and processes, these elements and processes should not be limited by these terms. These terms are only used to distinguish one element or process from another element or process. Thus, a first element or process discussed below could be termed a second element or process, without departing from the spirit and scope of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises," "comprising," "includes," and "including," when used in this specification, specify the presence of stated elements or processes, but do not preclude the presence or addition of one or more other elements or processes. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present disclosure refers to "one or more embodiments of the present disclosure."

It will be understood that when an element or layer is referred to as being "on", "connected to", "coupled to", or "adjacent to" another element, it can be directly on, connected to, coupled to, or adjacent to the other element, or one or more intervening element(s) may be present. In contrast, when an element is referred to as being "directly on," "directly connected to", "directly coupled to", or "immediately adjacent to" another element, there are no intervening elements present.

As used herein, the term "substantially" and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

Figure 2:
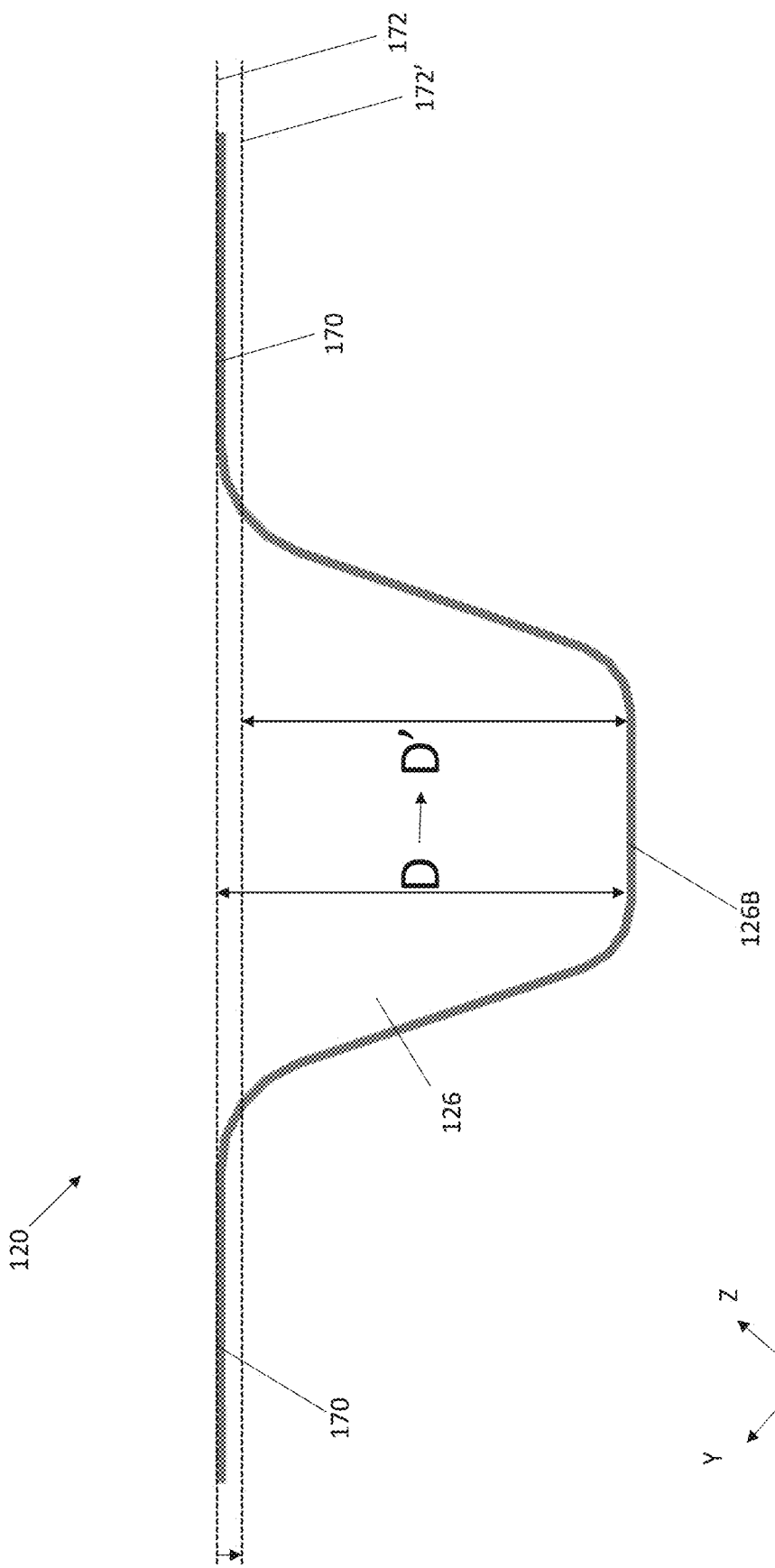
FIGS. 2 and 3 depict cross-sectional views of a striking face of the golf club head of FIG. 1 along the line 2'-2' in FIG. 1.
Figure 3:
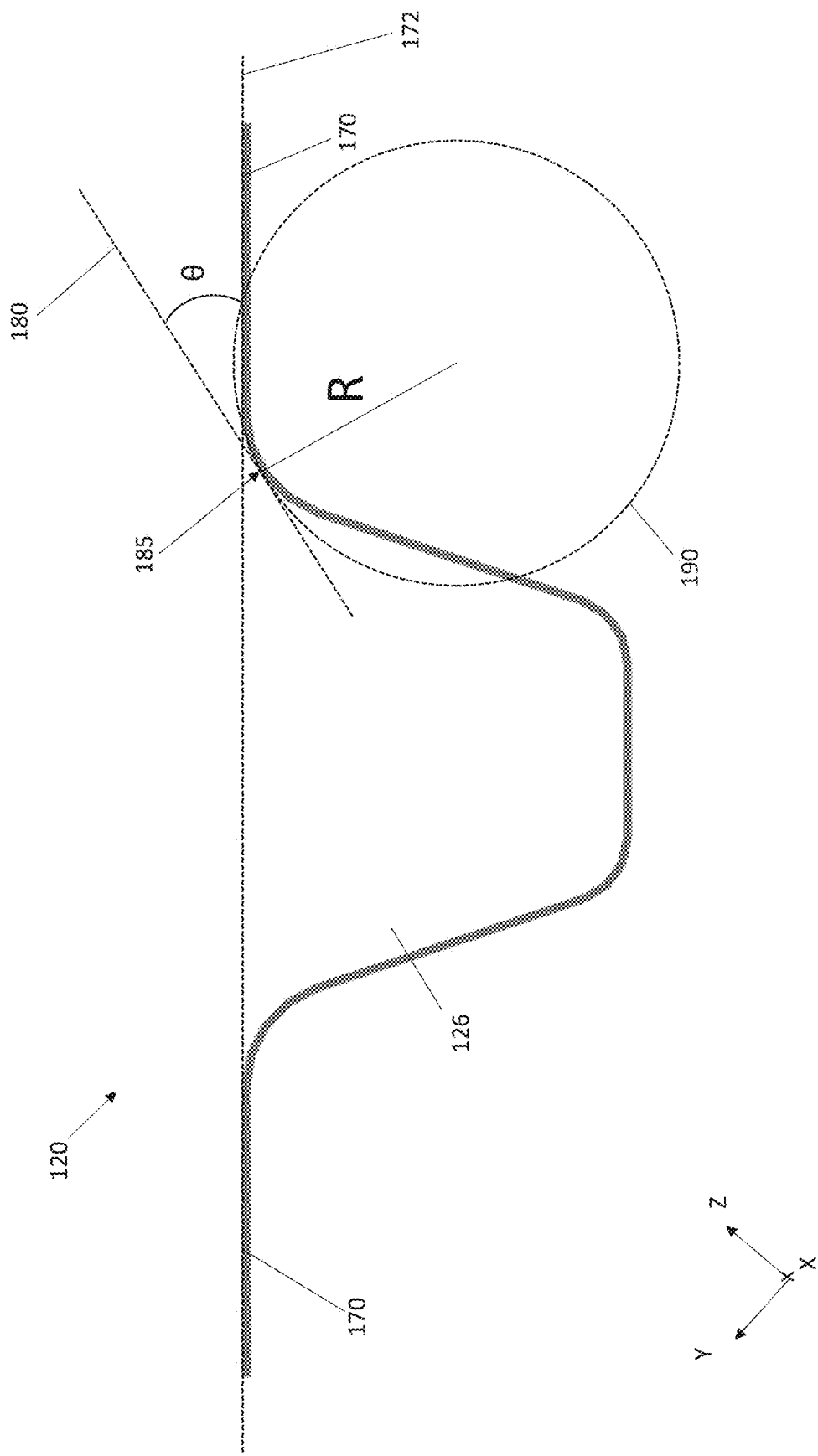

FIG. 1 depicts a frontal view of an example iron golf club head 101. FIGS. 2 and 3 depict cross-sectional views of a striking face 120 of the golf club head 101 of FIG. 1 along the line 2'-2' in FIG. 1.

The golf club head 101 may include a toe 110, a heel 130, the striking face 120 extending between the toe 110 and the heel 130 and having a lower leading edge 122 and an opposite upper topline edge 124, a hosel 132 disposed at the heel 130 and configured to couple to a golf club shaft (not shown), a sole 140 extending rearward from the lower leading edge 122, and a back portion (not shown) positioned rearward from the striking face 120 and coupled between the sole 122 and the upper topline edge 124. The striking face 120 may have a substantially flat land area 170 and a plurality of grooves 126 (or scorelines) extending in a toe-heel direction and arranged between the lower leading edge 122 and the upper topline edge 124. As used herein, the toe-heel direction may include both the toe-to-heel direction and the heel-to-toe direction.

An X-Y-Z coordinate axis may be defined as shown in FIGS. 1-3, wherein the X-axis is parallel to the toe-heel direction, the Y-axis is perpendicular to the x-axis and also parallel to a ground plane 111, and the Z-axis is perpendicular to the X-axis and the Y-axis, with the positive direction pointing out of the page in FIG. 1. The virtual land plane 172 may be perpendicular to the Y-Z plane.

FIG. 2 shows a cross-sectional view of a groove 126. As used herein, a groove depth of a groove 126 may be defined as a distance (e.g., a maximum distance) between the virtual land plane 172 and a bottom 126B of the groove 126, as measured along a depth direction perpendicular to the virtual land plane 172. In some examples, for purposes of measuring the groove depth of a specific groove, the virtual land plane 172 may be defined as being tangential to the outermost exterior surface of a portion of the land area 170 adjacent (e.g., immediately adjacent) to the specific groove 126.

As the golf club head 101 is used to hit golf balls, at least part of the striking face 120 may be worn down such that the land area 170 around a groove 126 (and the virtual land plane 172) are lowered towards the bottom 126B of the groove 126. For example, FIG. 2 depicts how the groove depth D associated with the virtual land plane 172 may decrease to a groove depth D' when the virtual land plane 172 is worn down to plane 172'. The groove depth of a specific groove may vary along the toe-heel direction. When a golf club head is new (having substantially no groove wear), the groove depth of a groove may be substantially uniform along the toe-heel direction. However, as the golf club head is used, a groove wear pattern may form where groove wear is greater at one region along the toe-heel direction (e.g., a toe-ward region) compared to at another region along the toe-heel direction (e.g., a heel-ward region). This may occur, for example, when a golfer routinely hits a golf ball at the same general region of the striking face.

Referring to FIG. 3, as used herein, a groove edge radius of a groove 126 may be defined as a radius R of a virtual circle 190 that is tangential to the outer surface of the striking face 120 at a contact point 185. The virtual circle 190 may be a virtual circle defined in a reference plane (e.g., the Y-Z plane) to which the toe-heel direction is perpendicular. The contact point 185 may be a point in the reference plane whereat a virtual reference line 180, which forms a smallest angle θ of a set value (e.g., 30 degrees) to the virtual land plane 172, is tangential to the exterior surface of the striking face 120 at the contact point 185.

As the golf club head 101 is used to hit golf balls, at least part of the edges of a groove may be flattened out, causing the groove edge radius to increase along at least part of the groove. The groove edge radius of a specific groove may vary along the toe-heel direction. When the golf club head is new (having substantially no groove wear), the groove edge radius of a specific groove may be substantially uniform along the toe-heel direction. However, as the golf club head is used to hit golf balls, a groove wear pattern may form where groove wear is greater at one region along the toe-heel direction (e.g., a toe-ward region) compared to at another region along the toe-heel direction (e.g., a heel-ward region). Accordingly, the groove edge radius in the one region may differ from the groove edge radius in the other region.

Figure 4:
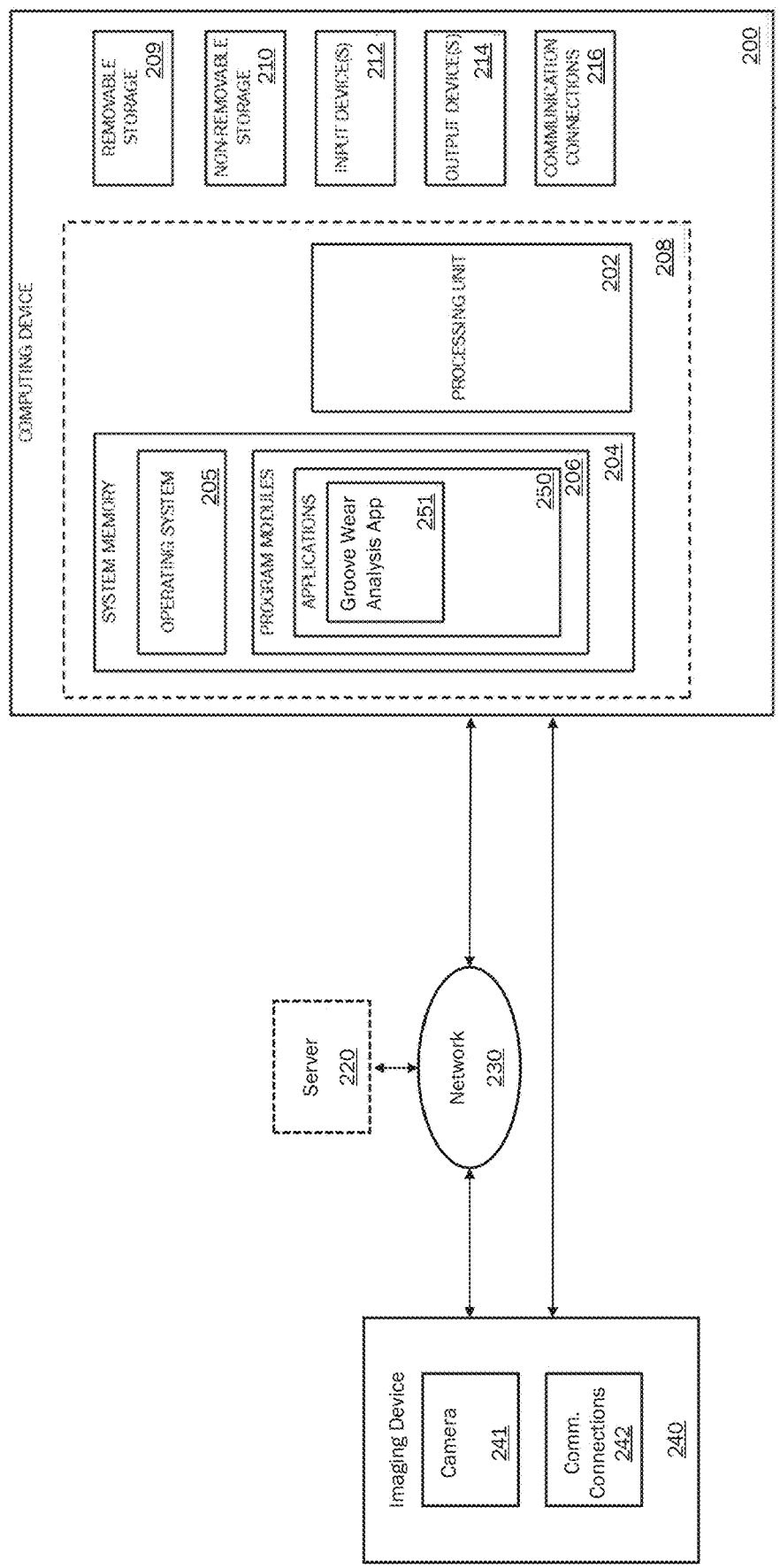
FIG. 4 depicts a block diagram illustrating components of a system for detecting groove wear of a golf club head according to some examples.

FIG. 4 depicts a block diagram illustrating components (e.g., hardware and software) of a system for detecting groove wear of a golf club head according to some examples. The system may include a computing device 200 communicatively coupled to an imaging device 240. The imaging device 240 may be communicatively coupled to the computing device 200 via a network 230, a wired connection, or a wireless connection, such as a Bluetooth connection. The imaging device 240 and/or the computing device 200 may be communicatively coupled to a server 220, for example, via the network 230. In some examples, the imaging device 240 and the computing device 200 may be integrated as a single device. For example, the imaging device 240 and the computing device 200 may be included in a phone, a tablet, a computer, a smart watch, smart glasses, etc. In some other examples, the imaging device 240 is separate from the computing device 200, but the imaging device 240 may also comprise a computing device similar to computing device 200 (e.g., having its own memory, processing unit(s), etc). For example, the imaging device 240 may be included in a first device, such as a phone, a tablet, a computer, a smart watch, smart glasses, etc., and the computing device 200 may be separate from the first device.

The imaging device 240 may be configured to capture an image including a digital color image and/or three-dimensional distance data of the striking face of a golf club head. The imaging device 240 may be configured to communicate the image to the computing device 200. The imaging device 240 may include at least one camera 241 and communication connections 242. The at least one camera 241 may include a digital camera configured to capture a digital color image of an object (e.g., of the striking face of the golf club head), a 3D scanning camera configured to capture three-dimensional data of the surfaces of the object, and/or a multi-purpose camera configured to both capture a digital color image and three-dimensional data about the object.

In some examples, the at least one camera 241 includes a plurality of 3D scanning cameras configured to obtain three-dimensional data of the object from different angles, which can be utilized to provide a more accurate description of the three-dimensional shape of the object. The three-dimensional data may describe the three-dimensional shape of one or more surfaces of the object. The 3D scanning camera may utilize any suitable 3D scanning technology generally available.

In some examples, the imaging device 240 may also include at least one processor and a memory. The at least one processor of the imaging device 240 may be configured to control operations of the imaging device 240 when executing computer-readable instructions stored in the memory of the imaging device 240. The memory of the imaging device 240 may be configured to store (e.g., temporarily store) images captured by the at least one camera 241. The communication connections 242 may be configured to communicate with the network 230 and/or with the computing device 200.

In a basic configuration, the computing device 200 may include at least one processing unit 202 (e.g., at least one processor) and a system memory 204. Depending on the configuration and type of computing device, the system memory 204 may include, but is not limited to, volatile storage (e.g., random access memory), non-volatile storage (e.g., read-only memory), flash memory, or any combination of such memories. The system memory 204 may include an operating system 205 and one or more program modules 206 suitable for running software applications 250 such as groove wear measurement applications 251. The groove wear measurement application 251 may include instructions that, when executed by the processing unit 202, cause the system to perform operations and processes described herein for measuring groove wear of a golf club. The operating system 205, for example, may be suitable for controlling the operation of the computing device 200. Furthermore, aspects of the invention may be practiced in conjunction with a graphics library, a data library, other operating systems, or any other application program and is not limited to any particular application or system. This basic configuration is illustrated in FIG. 4 by those components within a dashed line 208. The computing device 200 may have additional features or functionality. For example, the computing device 200 may also include additional data storage devices (removable and/or non-removable) such as, for example, magnetic disks, optical disks, or tape. Such additional storage is illustrated in FIG. 4 by a removable storage device 209 and a non-removable storage device 210.

As stated above, a number of program modules and data files may be stored in the system memory 204. While executing on the processing unit 202, the program modules 206 may perform processes including, but not limited to, one or more of the stages or operations of the methods described herein. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. Examples of the present disclosure may also be practiced using other technologies capable of performing logical operations such as, for example, AND, OR, and NOT, including but not limited to mechanical, optical, fluidic, and quantum technologies. In addition, aspects of the invention may be practiced within a computer or in any other circuits or systems.

The computing device 200 may also have one or more input device(s) 212 such as a keyboard, a mouse, a pen, a sound input device, a touch input device, etc. The computing device 200 may include a display and may also include other output device(s) 214 such as speakers, a printer, etc. The aforementioned devices are examples and others may be used. The computing device 200 may include one or more communication connections 216 allowing communications with other computing devices and/or with the imaging device 240. For example, the computing device 200 and imaging device 240 may communicate with each other via the communication connections 216 of the computing device 200 and the communication connections 242 of the imaging device 240. Examples of suitable communication connections 216 and 242 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 204, the removable storage device 209, and the non-removable storage device 210 may all be computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 200. Any such computer storage media may be part of the computing device 200. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6:
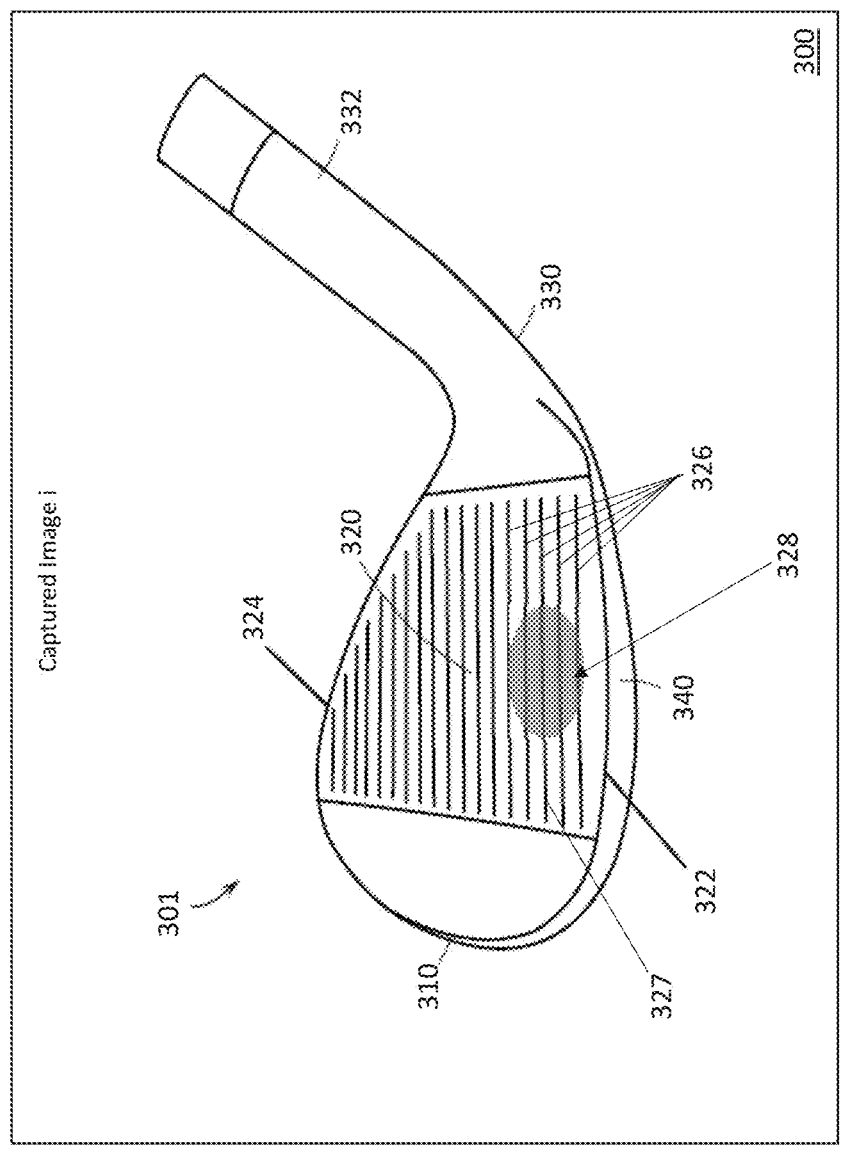
FIG. 6 depicts one captured image from the set of captured images of FIG. 5 according to some examples.
Figure 7:
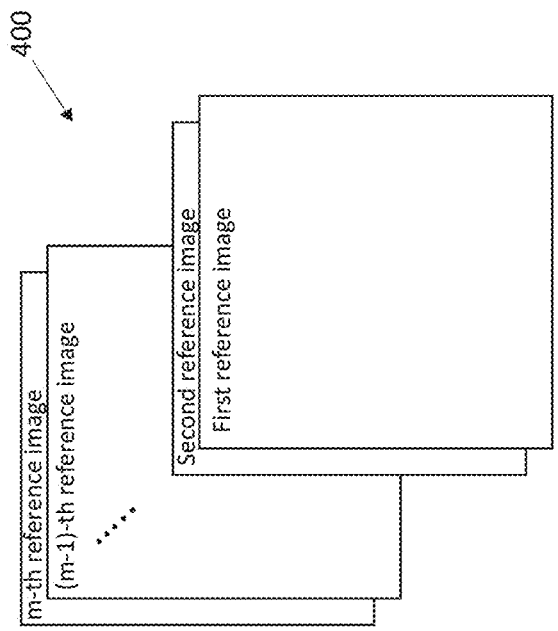
FIG. 7 depicts a set of reference images from the reference image library of FIG. 5 according to some examples.

FIG. 5 depicts one or more captured images 300 and a reference library 1000 according to some examples. FIG. 6 depicts a first captured image from among the plurality of captured images 300 of FIG. 5. FIG. 7 depicts a first set of reference images 400 from the reference library 1000 of FIG. 5. FIG. 8 depicts three reference images from the first set of reference images 400 of FIG. 7. FIG. 9 depicts reference images respectively from a second set of reference images 500, a third set of reference images 600, a fourth set of reference images 700, and a fifth set of reference images 800 from the reference library 1000 of FIG. 5.

Referring concurrently to FIGS. 4-9, the imaging device 240 may be configured to capture the one or more captured images 300 of a striking face 320 of a golf club head 301 and transmit the one or more captured images 300 to the computing device 200. The one or more captured images 300 may include digital color images and/or three-dimensional data of the striking face 320.

The processing unit 202 (when executing instructions stored in the system memory 204) may be configured to compare the one or more captured images 300 to a plurality of reference images from the reference library 1000, such as a first set of reference images 400, and to estimate a level of groove wear of the striking face 320 based on the comparison.

The level of groove wear may be defined, for example, as by a measure (e.g., percentage value) indicative of the level of groove wear, by a textual description (e.g., no wear, low wear, medium wear, high wear, extreme wear, etc.), or by one or more numerical values, such as a decrease (e.g., greatest decrease) of groove depth and/or an increase (e.g., greatest increase) of groove edge radius.

In some examples, the level of groove wear may be defined as a percentage ranging, for example, from 0% to 100% (or to a percentage value over 100%), where 0% may be indicative of no groove wear and 100% may be indicative of groove wear sufficient to recommend replacing the golf club head for one or more reasons (e.g., because the groove wear is of a degree that is associated with sufficiently high loss in performance and/or because the grooves are not compliant with regulations and rules relating to grooves). The percentage may be defined or calculated, for example, based on a decrease in groove depth and/or an increase in groove edge radius. In some examples, the level of groove wear may also be expressed in terms of the anticipated effect of the groove wear on performance of the club. For example, the level of groove wear may be expressed as a loss of X % of spin on a shot hit with average club head speed.

In some other examples, the level of groove wear may be defined as one or both of a decrease in groove depth and an increase in groove edge radius. The decrease in groove depth for a groove may be an average decrease in groove depth along the length of the groove in the toe-heel direction, or a greatest decrease in groove depth along the length of the groove in the toe-heel direction. The increase in groove edge radius for a groove may be an average increase in groove edge radius along the length of the groove in the toe-heel direction, or a greatest increase in groove edge radius along the length of the groove in the toe-heel direction.

Referring to FIG. 6, the golf club head 301 in the one or more captured images 300 is depicted as a wedge golf club head including a toe 310; a heel 330; the striking face 320 having a lower leading edge 322, an opposite upper topline edge 324, and a plurality of grooves 326 defined therein; a hosel 332 disposed at the heel 330; a sole 340; and a back portion coupled between the sole 340 and the upper topline edge 324. However, the present disclosure is not limited thereto. For example, the golf club head 301 may be a metal wood golf club head, a hybrid golf club head, a driver golf club head, or an iron golf club head.

The golf club head 301 may have groove wear 328 in the striking face 320 resulting, for example, from hitting golf balls, some golfers may hit golf balls at the same general region on the striking face 320, resulting in localized groove wear, as shown in the nonlimiting and non-exhaustive example depicted in FIG. 6. Other golfers may hit golf balls substantially randomly across the striking face 320, resulting in substantially uniform groove wear over the striking face 320.

In some examples, the one or more captured images 300 may include a plurality of captured images of the striking face 320. The plurality of captured images may all be taken when the striking face 320 has a substantially same level of groove wear, for example, after the golf club head 301 is used to hit a plurality of golf balls and before the golf club head 301 is used to hit additional golf balls. The plurality of captured images may be from different angles, which may provide more information regarding the groove wear 328 than a single captured image, and thus, improve the quality of the comparison between the plurality of captured images 300 and the plurality of reference images from the reference library 1000. Both the one or more captured images 300 and the reference images may be labeled, for example, when captured, with the angle at which they were taken to improve efficiency in matching the captured images 300 to the appropriate reference images. For example, a user interface presented at the imaging device 240 may instruct the user to capture a first image perpendicular to the striking face 120, a second image angled from the toe side of striking face 120, a third image angled from the heel side of striking face 120, etc.

The processing unit 200 (when executing instructions stored in the system memory 204) may compare the one or more captured images 300 to the first set of reference images 400 from the reference library 1000. The reference library 1000 may be stored in the system memory 204 or on the server 220, and the processing unit 202 may receive (e.g., retrieve) the reference library 1000 (or the plurality of reference images for use in the comparison) from the system memory 204 or the server 220.

The first set of reference images 400 may include a plurality of images of a first reference striking face 420 of a first reference golf club head 401 with different levels of groove wear 428. For example, the first set of reference images 400 may have been captured with a digital camera and include digital color information about the first reference striking face 420. The first reference golf club head 401 may include a toe 410; a heel 430; the striking face 420 having a lower leading edge 422, an opposite upper topline edge, and a plurality of grooves 426; a hosel 432; a sole 440; and a back portion.

The first reference golf club head 401 may be a same type of golf club head (e.g., same model of golf club head from a same manufacturer) as the golf club head 301. In some other examples, the first reference golf club head 401 is a type of golf club head most similar (e.g., most similar in terms of groove depth and/or in groove edge radius when no groove wear is present in the first reference golf club head 401 and in the golf club head 301) to the golf club head 301 from among golf club heads for which reference images are available in the reference library 1000. By comparing the one or more captured images to reference images of a same, or similar, type of golf club head, the comparison can yield more accurate results for the groove wear estimation compared to if reference images of a substantially different type of golf club head are used in the comparison.

Information about the types of golf club heads of the reference images in the reference library 1000 may be stored in the system memory 204 or in the server 220 and may be received (e.g., retrieved) by the processing unit 202. The processing unit 202 (when executing instructions stored in the system memory 204) may determine which reference images in the reference library 1000 are of a golf club head of a type that is the same as, or most similar to, the type of the golf club head 301 based on information about the golf club head 301 received by the computing device 200 (e.g., inputted into the computing device 200 by a person) or based on the one or more captured images 300, which may include information about what type the golf club head 301 is.

Referring to FIG. 9, the reference library 1000 may include (e.g., for each type of golf club head from among a plurality of types of golf club heads for which images are in the reference library 1000) a plurality of sets of reference images. Each set of reference images from among the plurality of sets may be associated with a same groove wear pattern. A groove wear pattern may refer to where on a striking face groove wear is most concentrated and/or where the greatest level of groove wear is, which may occur when a golfer routinely hits a golf ball at a same general region of the striking face. For example, the first set of reference images 400 may be associated with a pattern of groove wear 428 that is generally centered along the third groove from the lower leading edge 422. The second set of reference images 500 may be associated with a pattern of groove wear 528 that is more toe-ward, the third set of reference images 600 may be associated with a pattern of groove wear 628 that is more heel-ward, the fourth set of reference images 700 may be associated with a pattern of groove wear 728 that is lower (more toward a lower leading edge 722), and the fifth set of reference images 800 may be associated with a pattern of groove wear 828 that higher (more toward an upper topline edge 824).

The second, third, fourth, and fifth sets of reference images 500, 600, 700, and 800 may respectively include a plurality of images of second, third, fourth, and fifth golf club heads 501, 601, 701, and 801 with different levels of groove wear. The second reference golf club head 501 may include a toe 510; a heel 530; a striking face 520 having a lower leading edge 522, an opposite upper topline edge 524, a plurality of grooves 526, and groove wear 528; a hosel 532; a sole 540; and a back portion. The third reference golf club head 601 may include a toe 610; a heel 630; a striking face 620 having a lower leading edge 622, an opposite upper topline edge 624, a plurality of grooves 626, and groove wear 628; a hosel 632; a sole 640; and a back portion. The third reference golf club head 701 may include a toe 710; a heel 730; a striking face 720 having a lower leading edge 722, an opposite upper topline edge 724, a plurality of grooves 726, and groove wear 728; a hosel 732; a sole 740; and a back portion. The fourth reference golf club head 801 may include a toe 810; a heel 830; a striking face 820 having a lower leading edge 822, an opposite upper topline edge 824, a plurality of grooves 826, and groove wear 828; a hosel 832; a sole 840; and a back portion.

The processing unit 202 may be configured (when executing instructions stored in the system memory 204) to compare the groove wear 328 in the striking face 320 to the groove wear in the plurality of sets of reference images in the reference library 1000 (e.g., to a representative image from each of the plurality of sets of reference images, such as an image with the greatest level of groove wear), and determine which set of reference images from among the plurality of sets of reference images in the reference library 1000 is associated with a groove wear pattern that is most similar to the pattern of the groove wear 328 in the one or more captured images 300. The processing unit 202 may then compare the one or more captured images 300 to the determined set of reference images, and estimate a level of groove wear of the striking face 320 based on the comparison. In some examples, a variety of image recognition and comparison processes may be used by processing unit 202 to compare the captured images 300 to the reference library 1000. Among other possibilities, supervised and/or unsupervised learning may be used. For example, the processing unit 202 may implement a deep neural network to analyze individual image pixels and recognize similar images. In some examples, a labeled data set of the reference library 1000 is used to train the neural network. Convolutional neural network processors may also be used, for example, to automatically detect significant features of the images without supervision. Once a model of significant features is created, the captured images 300 may be fed into the trained model to determine the reference images with most similarity to the captured images 300. Other implementations are possible and contemplated.

Referring to FIGS. 7-8, the first set of reference images 400 may include m number of reference images including a first reference image where the first reference striking face 420 has no groove wear, a k-th reference image where the first reference striking face 420 has a first level of groove wear 428, and an m-th reference image where the first reference striking face 420 has a second level of groove wear 428' greater than the first level of groove wear 428. In some examples, a plurality of reference images from among the first set of reference images 400 may be images of the first reference striking face 420 having a same level of groove wear, for example, images of the first reference striking face 420 taken at different angles.

By comparing the one or more captured images 300 to the first set of reference images 400, the processing unit 202 may be configured to estimate the level of groove wear 328 of the golf club head 301. For example, the processing unit 202 (when executing instructions stored in the system memory 204) may be configured to determine which reference image from the first set of reference images 400 has groove wear most similar to (e.g., most visually similar to) the groove wear 328 of the golf club head 301 and to estimate the level of the groove wear 328 in the striking face 320 based on at least the determined reference image. For example, the processing unit 202 may be configured to compare the one or more captured images 300 to a first reference image from among the first set of reference images 400 (e.g., the k-th reference image) and a second reference image from among the first set of reference images 400 (e.g., the m-th reference image), and determine that groove wear 328 shown in the one or more captured images 300 is more similar to groove wear shown in one of the first and second reference images than to groove wear shown in the other one of the first and second reference images.

The processing unit 202 may be configured (when executing instructions stored in the system memory 204) to estimate the level of groove wear 328 of the striking face 320 based on at least a level of groove wear of the determined reference image. For example, the processing unit 202 may be configured to estimate the level of groove wear 328 to be the same as the level of groove wear of the determined reference image. In some examples, the determined reference image may be tagged in system memory 204 with metadata, or otherwise associated with, a particular level of groove wear 328 that was determined when the determined reference image was captured. In some other examples, the processing unit 202 is configured to linearly approximate the level of groove wear 328 based on the levels of groove wear of the determined reference image and of another reference image from among the first set of reference images 400 that the processing unit 202 determined has a level of groove wear next to most similar to the level of groove wear 328.

In some examples, the levels of groove wear respectively associated with the first set of reference images 400 are stored in the reference library 1000 and are received (e.g., retrieved) by the processing unit 202, for example, when the processing unit 202 receives the first set of reference images 400. In some examples, the level of groove wear may be expressed in terms of the anticipated effect of the groove wear on performance of the club. For example, the level of groove wear may be expressed as a loss of X % of spin on a shot hit under particular conditions. For example, empirical testing (e.g., robot swing testing) may be performed on club head 401 to determine the effect on spin imparted to the golf ball under certain conditions (e.g., club head speed, elevation, etc.) when the club head is in the condition shown in each of the reference images 400. The anticipated effect (e.g., X % loss of spin) may be stored as metadata or otherwise associated with each of the reference images 400 and used by the processing unit 202 to determine the level of groove wear depicted in the captured images 300.

In some examples, the grooves 326 in the striking face 328 may include a first groove 327 having a highest level of groove wear from among the grooves 326 in the one or more captured images 300, and the first reference striking face 420 may have a reference groove 427 having a greatest level of groove wear from among the grooves 426 in the first set of reference images 400 (excluding reference images where the striking face 420 has no groove wear). The processing unit 202 may be configured (when executing instructions stored in the system memory 204) to compare the first groove 327 in the one or more captured images 300 to the reference groove 427 in the first set of reference images 400. The processing unit 202 may be configured (when executing instructions stored in the system memory 204) to determine which reference image of the first set of reference images 400 shows groove wear in the reference groove 427 most similar to the groove wear of the first groove 327 in the one or more captured images 300, and to estimate the level of groove wear in the striking face 320 based on the comparison (e.g., based on at least the level of groove wear of the reference groove 427 in the determined reference image).

In some examples, the grooves 326 in the striking face 328 include an n-th groove numbered from the lower leading edge 322, and the first reference striking face 420 has an n-th groove numbered from the lower leading edge 422. The processing unit 202 may be configured (when executing instructions stored in the system memory 204) to compare the n-th groove from among the grooves 326 to the n-th groove in each of the first set of reference images 400. The processing unit 202 may be configured (when executing instructions stored in the system memory 204) to determine which reference image from among the first set of reference images 400 has groove wear in the n-th groove from among the grooves 426 that is most similar to the groove wear of the n-th groove from among the grooves 326 in the one or more captured images 300, and to estimate the level of groove wear in the striking face 320 based on the comparison (e.g., based on at least the level of groove wear of the n-th groove from among the grooves 426 in the determined reference image).

In some examples, the processing unit 202 is configured (when executing instructions stored in the system memory 204) to compare (e.g., compare as a whole, or respectively compare) a first set of grooves from among the grooves 326 in the one or more captured images 300 to a corresponding second set of grooves from among the grooves 426 in each of the first set of reference images 400. For example, the processing unit 202 may be configured to compare a set number (e.g., 3, 4, 5, or 6) of grooves from among the grooves 326 closest to the lower leading edge 322 in the one or more captured images 300 to the same set number of grooves from among the grooves 426 closest to the lower leading edge 422 in each of the first set of reference images 400. The processing unit 202 may be configured (when executing instructions stored in the system memory 204) to determine which reference image from among the first set of reference images 400 has groove wear in the second set of grooves most similar to the groove wear in the first set of grooves, and to estimate the level of groove wear in the striking face 320 based on the comparison (e.g., based on at least the level of groove wear in the second set of grooves in the determined reference image).

In some examples, the processing unit 202 is configured (when executing instructions stored in the system memory 204) to estimate, based on the one or more captured images 300, dimensions of a first groove of the grooves 326 in the striking face 320, and to estimate, based on the estimated dimensions of the first groove of the striking face 320 and relative to a reference groove in a reference striking face of a reference golf club head, groove wear of the striking face 300. The estimation may be based on at least one of a decrease in groove depth or an increase in groove edge radius of the first groove of the striking face 320.

The one or more captured images 300 may include three-dimensional distance data of the striking face 320, including three-dimensional distance data of the first groove of the striking face 320. For example, the one or more captured images 300 may be taken by one or more 3D scanning cameras, and the processing unit 202 may be configured to estimate the dimensions of the first groove of the striking face 320 based on the three-dimensional distance information of the one or more captured images 300. However, the present disclosure is not limited thereto. For example, the one or more captured images 300 may have been taken by one or more digital cameras and include digital color images of the striking face 320, and the processing unit 202 may be configured to estimate the dimensions of the first groove of the striking face 320 based on the visual information in the one or more captured images 300.

The processing unit 202 may be configured to base its estimation of the level of groove wear of the striking face 320 on the estimated dimensions of the first groove in the striking face 320 and information about groove wear of the reference groove of the reference striking face. The information about the groove wear of the reference groove of the reference striking face may be stored in the system memory 204 or in the server 220, and the processing unit 202 may be configured to receive (e.g., retrieve) the information about the groove wear of the reference groove from the system memory 204 or the server 220.

For example, the information about the groove wear of the reference groove of the reference striking face may be stored in the reference library 1000. In some examples, the reference striking face may be, for example, the first reference striking face 420 of the first reference golf club head 401, and the information about the groove wear of the reference groove may include one or more dimension data of a groove of the grooves 426 of the striking face 420 when having groove wear respectively associated with one or more reference images of the first set of reference images 420. For example, the one or more reference images of the first set of reference images 400 may have been taken by a 3D scanning camera, and may include three-dimensional distance data of the striking face 420.

In some examples, the information about the groove wear of the reference groove may include a plurality of different reference levels of groove wear (e.g., a plurality of different percentage values indicative of groove wear of the reference groove) and a plurality of different dimension data of the reference groove respectively associated with the plurality of different reference levels of groove wear. Each dimension data of the reference groove may include, for example, at least one of dimensions of the reference groove, a groove depth (e.g., a smallest groove edge depth) of the reference groove, a groove edge radius (e.g., a largest groove edge radius) of the reference groove when the reference groove has the associated level of groove wear. Each reference level of groove wear may be based, for example, on at least one of a decrease in groove depth (e.g., a decrease in smallest groove depth) of the reference groove when having the reference level of groove wear compared to when the reference groove has no groove wear, or an increase in groove edge radius (e.g., an increase in largest groove edge radius) of the reference groove when having the reference level of groove wear compared to when the reference groove has no groove wear.

The processing unit 202 may be configured (when executing instructions stored in the system memory 204) to compare the estimated dimensions of the first groove of the striking face 320 to each of the plurality of dimension data of the reference groove, and to determine which of the plurality of dimension data of the reference groove is most similar to the estimated dimensions of the first groove. For example, the processing unit 202 may be configured to perform at least one of the following: compare the estimated dimensions of the first groove of the striking face 320 to each of the dimensions of the reference groove respectively of the plurality of dimension data, to compare an estimated groove depth (e.g., a smallest groove depth) of the first groove of the striking face 320 to each groove depth (e.g., a smallest groove depth) of the reference groove respectively of the plurality of dimension data, or to compare an estimate groove edge radius (e.g., a largest groove edge radius) of the first groove of the striking face 320 to each groove edge radius (e.g., a largest groove edge radius) of the reference groove respectively of the plurality of dimension data.

The processing unit 202 may be configured (when executing instructions stored in the system memory 204) to estimate the level of groove wear of the striking face 320 based on (e.g., to be equal to, or to be approximated based on) the reference level of groove wear associated with the determined dimension data of the reference groove that was determined to be most similar to the estimated dimensions of the first groove.

In some examples, the information about the groove wear of the reference groove may include dimension data of the reference groove when the reference groove has no groove wear. The dimension data of the reference groove with no groove wear may include at least one of estimated dimensions of the reference groove, a groove depth of the reference groove, or a groove edge radius of the reference groove. The processing unit 202 may be configured to compare the estimated dimensions of the first groove to the dimension data of the reference groove with no groove wear and to estimate the level of groove wear of the striking face 320 based on a difference between the estimated dimensions of the first groove and the dimensions of the reference groove with no groove wear. In some examples, the processing unit 202 is configured to estimate at least one of a groove depth (e.g., a smallest groove depth) and a groove edge radius (e.g., a largest groove edge radius) of the first groove based on the estimated dimensions of the first groove. The processing unit 202 may be configured to determine at least one of a decrease in groove depth of the first groove based on the groove depth (e.g., a smallest groove depth) of the first groove and the groove depth of the reference groove with no groove wear, or an increase in groove edge radius of the first groove based on the groove edge radius (e.g., a largest groove edge radius) of the first groove and the groove edge radius of the reference groove with no wear. Based on at least one of the determined decrease in groove depth or the determined increase in groove edge radius, the processing unit 202 may be configured to determine the level of groove wear of the striking face 320.

In some examples, the first groove is the groove 327 in the striking face 320 having a highest level of groove wear from among the grooves 326, and the reference groove is a groove having a greatest level of groove wear from among grooves in the reference striking face (e.g., the groove 427 in the first reference striking face 427). In some other examples, the first groove is an n-th groove numbered from the lower leading edge 322, and the reference groove is an n-th groove numbered from a lower leading edge of the reference striking face (e.g., an n-th groove numbered from the lower leading edge 422 of the first reference striking face 420).

The reference golf club head may be a same type of golf club head as the golf club head 301, or the reference golf club head may be a type of golf club head most similar to the golf club head 301 from among golf club heads for which groove wear information is stored in the system memory 204 or in the server 220 (e.g., stored in the reference library 1000).

In some examples, the processing unit 202 is configured (when executing instructions stored in the system memory 204) to estimate, based on the one or more captured images 300 (e.g., based on three-dimensional distance information about the striking face 320 in the one or more captured images 300), the dimensions of each groove of a first set of grooves from among the grooves 326 of the striking face 320. For example, the processing unit 202 may be configured to estimate the dimensions of a set number (e.g., 3, 4, 5, or 6) of grooves from among the grooves 326 closest to the lower leading edge 322. Dimension data about each of a second set of reference grooves in the reference striking face corresponding to the first set of reference grooves may be received (e.g., retrieved) by the processing unit 202. The dimension data about each of the second set of reference grooves may include at least one of dimensions of each of the second set of reference grooves, groove depths (e.g., smallest groove depths) of each of the second set of reference grooves, and groove edge radii (e.g., largest groove edge radii) of each of the second set of reference grooves.

The processing unit 202 may be configured to compare the estimated dimensions of the first set of grooves respectively to the dimension data (e.g., at least one of groove dimensions, groove depths, or groove edge radii) of the second set of grooves, and to estimate the level of groove wear in the striking face 320 based on the comparison. For example, the processing unit 202 may be configured to compare at least one of groove depth or groove edge radius of each groove of the first set of grooves respectively to that of the corresponding groove of the second set of grooves.

Figure 10:
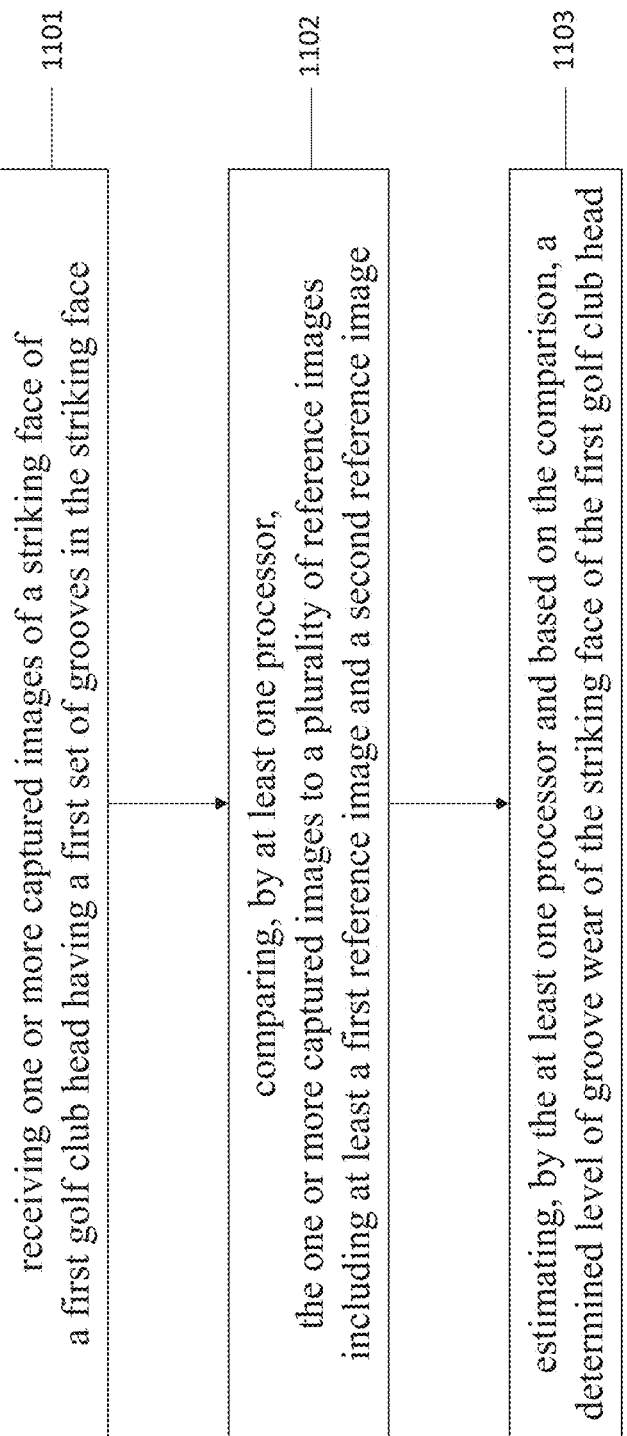

FIGS. 10 and 11 each illustrate flow diagrams for methods 1100 and 1200 for estimating a level of groove wear in a golf club head according to some nonlimiting and non-exhaustive examples. The methods of FIGS. 10 and 11 may be performed, for example, utilizing the computing device 200 and the imaging device 240 according to any suitable examples thereof within the scope of the present disclosure.

Referring to FIG. 10, the method 1100 may include a first process 1101 of receiving one or more captured images of a striking face of a first golf club head having a first set of grooves in the striking face. The one or more captured images may be received, for example, by the computing device 200. The method 1100 may include a second process 1102 of comparing, by at least one processor, the one or more captured images to a plurality of reference images including at least a first reference image and a second reference image. The first reference image may include an image of a first reference striking face having a first level of groove wear, and the second reference image may include an image of a second reference striking face having a second level of groove wear different from the first level of groove wear. In some examples, the first and second striking faces are of the same golf club head, but differ in terms of level of groove wear. The method 1100 may include a third process 1103 of estimating, by the at least one processor and based on the comparison, a determined level of groove wear of the striking face of the first golf club head. The comparison and the estimation may be performed, for example, in any manner within the scope of the present disclosure.

Referring to FIG. 11, the method 1200 may include a first process 1201 of receiving one or more captured images of a striking face of a golf club head having a groove in the striking face. The method 1200 may include a second process 1202 of estimating, by at least one processor and based on the one or more captured images, dimensions of the groove. The method 1200 may include a third process 1203 of estimating, based on the estimated dimensions of the groove and relative to a reference groove in a reference striking face of a reference golf club head, groove wear of the striking face. The estimation of the groove wear of the striking face may be based on at least one of a decrease in groove depth of the groove or an increase in groove edge radius of the groove. The estimations of the dimensions of the groove and of the groove wear of the striking face may be performed, for example, in any manner within the scope of the present disclosure.

Although some methods for estimating groove wear have been discussed with reference to FIGS. 10 and 11, the present disclosure is not limited thereto. Systems for estimating groove wear, and processes performed by such systems, have been described herein with reference to FIGS. 4-9, and the present disclosure includes all method for estimating groove wear that include any combination of such processes in any suitable order.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method for estimating groove wear, comprising:
receiving, by at least one processor, one or more captured images of a striking face of a first golf club head having a first set of grooves in the striking face;
retrieving, by the at least one processor, a plurality of reference images including a first reference image and a second reference image;
comparing, by the at least one processor, the one or more captured images to the plurality of reference images, wherein the first reference image comprises an image of a first reference striking face having a first level of groove wear, and the second reference image comprises an image of a second reference striking face having a second level of groove wear different from the first level of groove wear;
estimating, by the at least one processor and based on the comparison, a determined level of groove wear of the striking face of the first golf club head; and
providing the determined level of groove wear.

2. The method of claim 1, wherein the comparing comprises determining that groove wear of the first set of grooves in the one or more captured images more closely resembles groove wear of a set of grooves in the first reference striking face in the first reference image than groove wear of a set of grooves in the second reference striking face in the second reference image, and
wherein the estimating comprises estimating the determined level of groove wear of the striking face of the first golf club head based on the first level of groove wear.

3. The method of claim 1, wherein a first groove from among the first set of grooves has a greatest level of wear in the one or more captured images, a first reference groove has a greatest level of wear from among a set of grooves in the first reference striking face in the first reference image, and a second reference groove has a greatest level of wear from among a set of grooves in the second reference striking face in the second reference image, and
wherein the comparing comprises comparing the first groove in the one or more captured images to the first reference groove in the first reference image and to the second reference groove in the second reference image.

4. The method of claim 1, wherein the first set of grooves comprises an Nth groove from a lower leading edge of the striking face of the first golf club head, the first reference striking face has a set of grooves comprising an Nth groove from a lower leading edge of the first reference striking face, the second reference striking face has a set of grooves comprising an Nth groove from a lower leading edge of the second reference striking face, and
wherein the comparing comprises comparing the Nth groove of the striking face in the one or more captured images to the Nth groove of the first reference striking face in the first reference image and to the Nth groove of the second reference striking face in the second reference image.

5. The method of claim 1, wherein the comparing comprises comparing the first set of grooves in the striking face of the first golf club head in the one or more captured images respectively to a set of corresponding grooves in the first reference striking face in the first reference image and respectively to a set of corresponding grooves in the second reference striking face in the second reference image.

6. The method of claim 1, wherein the first golf club head, a golf club head having the first reference striking face, and a golf club head having a second reference striking face are all a same type of golf club head.

7. The method of claim 1, wherein the reference images are retrieved from electronic storage, and
wherein the method further comprises retrieving, from the electronic storage and for each reference image of the reference images, at least one of a groove depth or a groove edge radius of one or more grooves shown in the reference image.

8. The method of claim 1, wherein the method further comprises capturing the one or more captured images by a camera, and
wherein the camera and the at least one processor are in a phone, a tablet, a computer, a smart watch, or smart glasses.

9. A method for estimating groove wear, comprising:
receiving, by at least one processor, one or more captured images of a striking face of a golf club head having a groove in the striking face;
estimating, by the at least one processor and based on the one or more captured images, dimensions of the groove;
estimating, based on the estimated dimensions of the groove and relative to a reference groove in a reference striking face of a reference golf club head, groove wear of the striking face based on at least one of a decrease in groove depth of the groove or an increase in groove edge radius of the groove; and
providing the estimated groove wear.

10. The method of claim 9, wherein the golf club head and the reference golf club head are a same type of golf club head, and the reference groove has substantially no groove wear.

11. The method of claim 9, comprising at least one of:
estimating the decrease in groove depth of the groove by determining a groove depth of the groove based on the estimated dimensions of the groove, retrieving a groove depth of the reference groove from a memory, and comparing the groove depth of the groove to the groove depth of the reference groove, or
estimating the increase in groove edge radius of the groove by determining a groove edge radius of the groove based on the estimated dimensions of the groove, retrieving a groove edge radius of the reference groove from a memory, and comparing the groove edge radius of the groove to the groove edge radius of the reference groove.

12. The method of claim 9, wherein:
the groove is a groove that has a greatest level of groove wear from among a set of grooves in the striking face, and the reference groove is a groove that has a greatest level of groove wear from among a set of grooves in the reference striking face, or
the groove is an Nth groove from a lower leading edge of the striking face from among a set of grooves in the striking face, and the reference groove is an Nth groove from a lower leading edge of the reference striking face from among a set of grooves in the reference striking face.

13. The method of claim 9, wherein a set of grooves are in the striking face, a set of respectively corresponding reference grooves are in the reference striking face, and the method further comprises:
estimating, by the at least one processor, dimensions of each of the set of grooves in the striking face; and
comparing, by the at least one processor and in terms of at least one of groove depth or groove edge radius, each of the set of grooves respectively to the set of corresponding reference grooves.

14. The method of claim 9, wherein the estimating the dimensions of the groove and the estimating the groove wear of the striking face are performed by the at least one processor when executing instructions stored in a memory operatively coupled to the at least one processor.

15. The method of claim 14, further comprising capturing, by a camera, the one or more captured images,
wherein the camera, the at least one processor, and the memory are included in a phone, a tablet, a computer, a smartwatch, or smart glasses.

16. The method of claim 14, wherein the at least one processor is in a first device, and the method further comprises wirelessly receiving the one or more captured images from a second device.

17. A system, comprising:
at least one processor; and
a memory, operatively connected to the at least one processor and storing instructions that, when executed, cause the at least one processor to perform a method, the method comprising:
receiving, by the at least one processor, one or more captured images of a striking face of a first golf club head having a first set of grooves in the striking face;
retrieving, by the at least one processor, a plurality of reference images including a first reference image and a second reference image;
comparing, by the at least one processor, the one or more captured images to the plurality of reference images, wherein the first reference image comprises an image of a first reference striking face having a first level of groove wear, and the second reference image comprises an image of a second reference striking face having a second level of groove wear different from the first level of groove wear;
estimating, by the at least one processor and based on the comparison, a determined level of groove wear of the striking face of the first golf club head; and
providing the determined level of groove wear.

18. The system of claim 17, wherein the comparing comprises determining that groove wear of the first set of grooves in the one or more captured images more closely resembles groove wear of a set of grooves in the first reference striking face in the first reference image than groove wear of a set of grooves in the second reference striking face in the second reference image, and
wherein the estimating comprises estimating the determined level of groove wear of the striking face of the first golf club head based on the first level of groove wear.

19. The system of claim 17, further comprising a camera, wherein the method further comprises capturing, by the camera, the one or more captured images, and
wherein the at least one processor, the memory, and the camera are in a phone, a tablet, a computer, a smartwatch, or smart glasses.

20. The system of claim 17, wherein the at least one processor are in a first device, and the method further comprises wirelessly receiving the one or more captured images from a second device.

* * * * *